(12) United States Patent
Hodoshima et al.

(10) Patent No.: US 8,832,967 B2
(45) Date of Patent: Sep. 16, 2014

(54) METHOD FOR REMOVING SULFUR COMPOUNDS IN CASTABLE

(75) Inventors: Shinya Hodoshima, Yokohama (JP); Fuyuki Yagi, Yokohama (JP); Shuhei Wakamatsu, Yokohama (JP); Kenichi Kawazuishi, Yokohama (JP)

(73) Assignees: Japan Oil, Gas and Metals National Corporation, Tokyo (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP); Chiyoda Corporation, Yokohama-shi (JP)

( * ) Notice: Subject to any disclaimer, the term of this patent is extended or adjusted under 35 U.S.C. 154(b) by 0 days.

(21) Appl. No.: 13/581,019

(22) PCT Filed: Feb. 21, 2011

(86) PCT No.: PCT/JP2011/000935
§ 371 (c)(1),
(2), (4) Date: Aug. 24, 2012

(87) PCT Pub. No.: WO2011/108213
PCT Pub. Date: Sep. 9, 2011

(65) Prior Publication Data
US 2012/0317833 A1    Dec. 20, 2012

(30) Foreign Application Priority Data
Mar. 2, 2010 (JP) ................. 2010-045698

(51) Int. Cl.
*F26B 3/06* (2006.01)
*B01J 19/02* (2006.01)
*C01B 3/48* (2006.01)
*C01B 3/38* (2006.01)

(52) U.S. Cl.
CPC . *C01B 3/38* (2013.01); *B01J 19/02* (2013.01); *C01B 2203/0238* (2013.01); *C01B 2203/062* (2013.01); *C01B 2203/0475* (2013.01); *C01B 2203/0485* (2013.01); *C01B 2203/0888* (2013.01); *C01B 2203/0233* (2013.01); *B01J 2219/0204* (2013.01); *C01B 2203/1241* (2013.01); *C01B 2203/0455* (2013.01); *C01B 2203/0283* (2013.01); *C01B 2203/127* (2013.01); *C01B 3/48* (2013.01); *C01B 2203/0415* (2013.01); *C01B 2203/148* (2013.01)
USPC .......................................................... 34/517

(58) Field of Classification Search
USPC ........... 34/443, 516, 517, 437, 439, 104, 107; 134/22.15, 22.12, 22.18, 30, 37, 19
See application file for complete search history.

(56) References Cited

U.S. PATENT DOCUMENTS

| | | | | |
|---|---|---|---|---|
| 2,721,122 | A * | 10/1955 | Linden et al. | 48/74 |
| 2,730,437 | A * | 1/1956 | Coombe | 48/74 |
| 2,893,853 | A * | 7/1959 | Milbourne | 48/74 |
| 3,865,745 | A | 2/1975 | Block et al. | |
| 4,002,720 | A | 1/1977 | Wheelock et al. | |
| 4,058,575 | A * | 11/1977 | Cahn et al. | 585/707 |
| 4,270,928 | A | 6/1981 | Frischmuth | |
| 4,276,081 | A | 6/1981 | Kindig et al. | |
| 4,420,342 | A * | 12/1983 | Gettert et al. | 134/22.12 |
| 5,068,058 | A * | 11/1991 | Bushinsky et al. | 252/376 |
| 5,202,057 | A * | 4/1993 | Nicholas et al. | 252/376 |
| 6,005,149 | A * | 12/1999 | Bishop | 201/36 |

FOREIGN PATENT DOCUMENTS

| | | |
|---|---|---|
| CN | 1745110 A | 3/2008 |
| JP | 2000-329323 A | 11/2000 |
| JP | 2003-021314 A | 1/2003 |
| JP | 2003-336079 A | 11/2003 |
| WO | 2004/069882 A1 | 8/2004 |

OTHER PUBLICATIONS

Notification of Transmittal of Translation of the International Preliminary Report on Patentabililty (Forms PCT/IB/326 and PCT/IB/338) of International Application No. PCT/JP2011/000935 mailed Sep. 20, 2012 with Forms PCT/IB/373 and PCT/ISA/237.
International Search Report of PCT/JP2011/000935, mailing date Apr. 5, 2011.
Japanese Written Opinion of PCT/JP2011/000935, mailing date Apr. 5, 2011.
Extended European Search Report dated Dec. 17, 2013, issued in corresponding European Application No. 11750327.6. (5 pages).
Chinese Office Action dated Dec. 25, 2013; issued in corresponding Chinese Application No. 201180011677.X.

* cited by examiner

*Primary Examiner* — Kenneth Rinehart
*Assistant Examiner* — Tavia Sullens
(74) *Attorney, Agent, or Firm* — Westerman, Hattori, Daniels & Adrian, LLP

(57) ABSTRACT

A situation where sulfur compounds originating from a castable are mixed into synthesis gas produced by way of a reforming reaction and the mixed sulfur compounds are separated and collected with carbon dioxide and further fed into a reformer to thereby degrade the reforming catalyst of the reformer by sulfur poisoning is avoided. Purge gas that is steam or steam-containing gas is made to flow into the piping to be used for a synthesis gas production apparatus and dried out to remove the sulfur compounds contained in the castable prior to the start-up of operation of the synthesis gas production apparatus, in order to prevent the sulfur compounds from being released by hot synthesis gas.

11 Claims, 2 Drawing Sheets

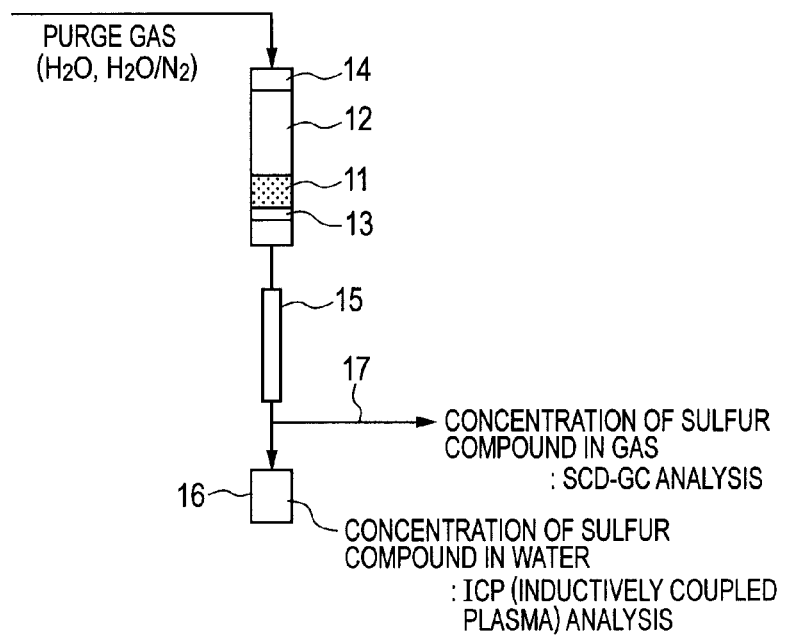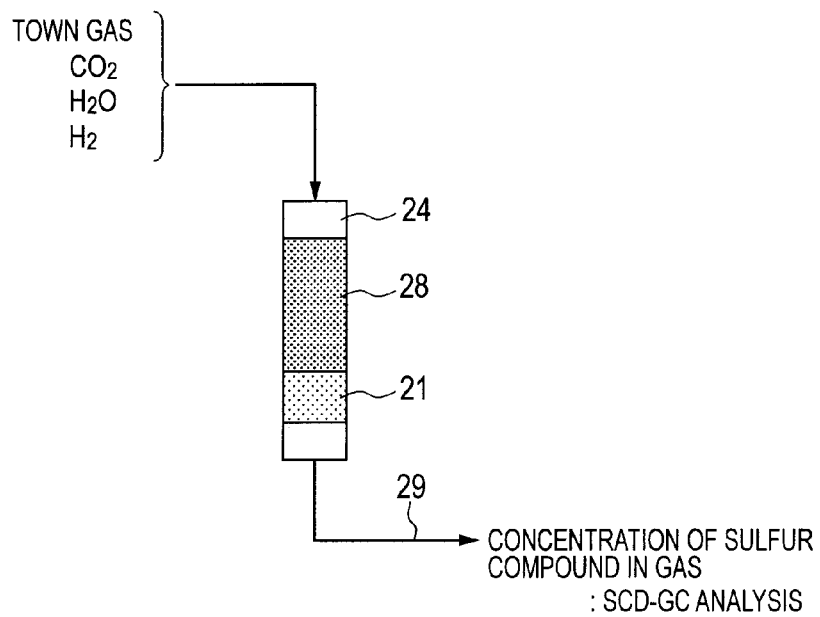

METHOD FOR REMOVING SULFUR COMPOUNDS IN CASTABLE

TECHNICAL FIELD

This invention relates to a method for removing sulfur compounds contained in a castable that is coated as a refractory material on the inner surface of a reactor, piping or the like. More particularly, the present invention relates to a method for removing sulfur compounds contained in a castable that is coated as a refractory material on the inner surface of a piping connecting the exit of a reforming tube of a synthesis gas production apparatus and a waste heat boiler, prior to the start-up of operation of the synthesis gas production apparatus.

BACKGROUND ART

Reactors and piping where reactions are required to be conducted at high temperature such as a synthesis gas production apparatus for producing synthesis gas by using natural gas as raw material are provided with coating as a refractory material on the inner surfaces thereof. Castable is often employed as a refractory material because it can be provided with ease. In many cases, castable contains sulfur compounds to a small extent and the sulfur compounds are released when it is exposed to high temperatures. Then, the released sulfur compounds can adversely affect the downstream apparatus and the products.

In the process of producing synthetic hydrocarbons such as naphtha, kerosene and gas oil by way of chemical reactions, in which natural gas is used as raw material, generally synthesis gas (mixture gas of carbon monoxide and hydrogen) is produced as an intermediate by a reforming reaction.

When producing synthesis gas, firstly the sulfur compounds contained in the natural gas to be used as raw material are removed in a desulfurization unit. Then, steam and/or carbon dioxide is added to the desulfurized natural gas and subsequently the desulfurized natural gas is introduced into a synthesis gas production apparatus and heated in a reformer. As a result, a reforming reaction proceeds in the reformer due to a catalysis of the reforming catalyst filled in the reformer to thereby produce synthesis gas. While a steam reforming method using steam is mainly employed for the reforming reaction, a carbon dioxide reforming method using carbon dioxide has been put to practical use in recent years. A carbon dioxide reforming method does not require removal of the carbon dioxide contained in natural gas before a reforming reaction and hence provides an advantage of improving the efficiency of synthesis gas production process and reducing the cost. Furthermore, the unreacted carbon dioxide contained in the produced synthesis gas and the produced carbon dioxide can be separated and collected for recycling in the synthesis gas production process so as to be reused by the carbon dioxide reforming reaction. Thus, carbon dioxide can be highly efficiently exploited as resource.

Thereafter, typically, liquid hydrocarbons are produced from the produced synthesis gas by way of a Fischer-Tropsch reaction and synthetic hydrocarbons such as product fuel oil are produced by hydroprocessing the obtained liquid hydrocarbons in a hydrogenation process. The series of steps including a Fischer-Tropsch reaction is referred to as Gas-to-Liquids (GTL) process. Synthesis gas can also be used for methanol synthesis and oxo-synthesis.

Reforming reactions proceed at high temperatures typically between 700 and 900° C. in the case of steam reforming method, for example. Therefore, the synthesis gas that is discharged from the exit of a reformer is fed to a waste heat boiler for a heat-exchange process by way of piping coated with refractory castable.

SUMMARY OF INVENTION

Technical Problem

When the produced gas passes through the piping, the sulfur compounds originally contained in the castable can be released from the castable and mixed into the gas. Additionally, since carbon dioxide is separated and collected from the produced synthesis gas by chemical absorption using a weakly basic aqueous solution such as an amine solution, the sulfur compounds contained in the produced gas are separated and collected with carbon dioxide at the same time. Then, the separated and collected gas is supplied to a synthesis gas production reformer in a state of containing the sulfur compounds released from the castable to consequently give rise to a problem that the reforming catalyst used in the reformer is degraded by poisoning due to the adsorbed sulfur compounds.

An object of the present invention is to avoid that sulfur compounds are released from the castable that is coated as refractory material on the inner surface of a reactor, piping or the like to consequently adversely affect the downstream apparatus and the products. Another object of the present invention is to avoid degradation of the reforming catalyst in the reformer by sulfur poisoning, which occurs in the way that: the sulfur compounds originating from the castable is mixed into the gas produced by a reforming reaction; the mixed sulfur compounds are separated and collected with carbon dioxide; and the sulfur compounds are supplied into the reformer when the collected carbon dioxide is recycled for the raw material.

Solution to Problem

In view of the above-mentioned problem, the present invention is characterized in that the castable coated as refractory material on the inner surface of a reactor, piping or the like is dried out by flowing purge gas that is steam or steam-containing gas to remove the sulfur compounds in the castable. Additionally, the present invention is characterized in that the piping or the like of a synthesis gas production apparatus is dried out by flowing purge gas that is steam or steam-containing gas to it prior to the start-up of operation of the synthesis gas production apparatus to remove the sulfur compounds contained in the castable thereof in advance.

Advantageous Effects of Invention

A means according to the present invention can prevent sulfur compounds from being released from the castable coated as a refractory material on the inner surface of a reactor, piping or the like and hence avoid that the sulfur compounds adversely affect the downstream apparatus and the products. Additionally, the sulfur compounds contained in the castable being employed on the piping of a synthesis gas production apparatus are removed from the castable before any reforming reaction starts and hence the sulfur compounds originating from the castable can be prevented from being mixed into the synthesis gas and the reforming catalyst for producing synthesis gas from being degraded.

BRIEF DESCRIPTION OF DRAWINGS

FIG. 1 is a schematic illustration of the test for removing sulfur compounds from castable in Example 1.

FIG. 2 is a schematic illustration of the reforming reaction test in Example 2.

DESCRIPTION OF EMBODIMENTS

Figure 3:
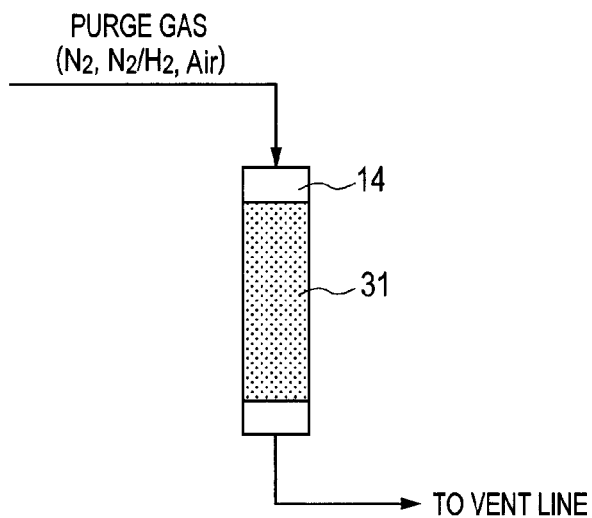
FIG. 3 is a schematic illustration of the tests for removing sulfur compounds from castable in Comparative Examples 1 through 5.

A method for removing sulfur compounds from castable to be used for a reactor or piping is characterized by flowing in advance purge gas that is steam or steam-containing gas to the reactor or the piping for which the castable is to be used as refractory material. The reactor or piping may be the ones used for any apparatus so long as castable is employed as refractory material. Particularly, when the unreacted carbon dioxide contained in the produced synthesis gas and the produced carbon dioxide in a synthesis gas production apparatus are separated and collected for recycling to the synthesis gas production process so as to be reutilized by a carbon dioxide reforming reaction, the problem that, the sulfur compounds released from castable is separated and collected therewith and supplied to the synthesis gas production reformer so that the reforming catalyst being used in the reformer is degraded by poisoning due to the adsorbed sulfur compounds, can be prevented from taking place by conducting the method of the present invention prior to the start-up of operation of the synthesis gas production apparatus.

A synthesis gas production apparatus to be used for the purpose of the present invention includes at least: a reformer for producing synthesis gas from natural gas by way of a reforming reaction; and piping for connecting the reformer and other sections of the apparatus. Castable is employed for all or part of the piping at least including the reformer exit. Additionally, a synthesis gas production apparatus to be used for the purpose of the present invention may include a carbon dioxide removal step for separating and collecting the carbon dioxide in the produced synthesis gas that is arranged downstream relative to the reformer, so that the gas separated and collected (to be referred to as "separated and collected gas" hereinafter") and containing carbon dioxide is recycled so as to be reutilized in the reformer.

A synthesis gas production apparatus to be used for the purpose of the present invention may include a desulfurizing step for desulfurizing the sulfur compounds contained in natural gas. Furthermore, it may additionally include steps that known synthesis gas production apparatus include, such as a heat recovery step for recovering the heat generated by a reforming reaction, an oxygen supplying step, a synthesis gas adjusting step. When a waste heat treatment is conducted by using a heat recovery step which may be a waste heat boiler for the produced synthesis gas, the heat recovery step is preferably arranged as a step downstream relative to the reformer and upstream relative to the carbon dioxide removal step.

The reformer is equipped with a catalyst tube filled with a reforming catalyst and, when natural gas that is mixed with carbon dioxide and steam is heated in the catalyst tube, a reforming reaction proceeds catalytically due to reforming catalyst to produce synthesis gas.

In the present embodiment, a reforming reaction can be made to take place by a known method such as a steam reforming method that uses steam or a carbon dioxide reforming method that uses carbon dioxide.

A steam reforming method is a method for producing synthesis gas by adding steam to natural gas and according to reaction formula (1) shown below, whereas a carbon dioxide reforming method is a method for producing synthesis gas by adding carbon dioxide to natural gas or using carbon dioxide contained in natural gas and according to reaction formula (2) shown below. Note that, each of the formulas listed below shows a reaction for reforming methane contained in natural gas.

$$CH_4 + H_2O \rightarrow CO + 3H_2 \qquad \text{formula (1):}$$

$$CH_4 + CO_2 \rightarrow 2CO + 2H_2 \qquad \text{formula (2):}$$

Only either of the above formulas may be used in this embodiment. However, note that the ratio of the CO and the $H_2$ that are generated can be adjusted by using both a steam reforming method and a carbon dioxide reforming method at the same time. Then, it is possible to bring the ratio close to $H_2/CO=2.0$ that is a preferable ratio for a Fischer-Tropsch reaction and methanol synthesis or to $H_2/CO=1.0$ that is a preferable ratio for oxo-synthesis to eliminate the following cumbersome ratio adjusting operation.

While any known reforming catalyst can be used as a reforming catalyst, a nickel-loaded alumina catalyst, a noble-metal-loaded basic oxide catalyst or the like is preferably employed for a steam reforming method, and a noble-metal-loaded basic oxide catalyst or the like is preferably employed for a carbon dioxide reforming method. A noble-metal-loaded basic oxide catalyst or the like is preferably employed when a steam reforming method and a carbon dioxide reforming method are used at the same time.

The concentration of the sulfur compounds contained in the gas to be introduced into a synthesis gas production step is preferably less than 10 vol-ppm in terms of sulfur atoms for the purpose of suppressing degradation of the reforming catalyst.

Steam and/or carbon dioxide is added to the gas to be introduced into the synthesis gas production step so as to make the $H_2O/C$ mol ratio thereof larger than 0 and less than 3.0 and/or the $CO_2/C$ mol ratio thereof larger than 0 and less than 1.0.

Natural gas contains organic sulfur compounds such as dimethyl sulfide (DMS: $(CH_3)_2S$) and carbonyl sulfide (COS). Therefore, natural gas is preferably desulfurized by means of a desulfurizing apparatus arranged in the desulfurizing step in the synthesis gas production apparatus before it is introduced into the reformer.

A known method such as an alkali washing method, a solvent desulfurization method or a catalytic desulfurization method may be used to desulfurize natural gas. Of these, the use of a catalytic desulfurization method (hydrodesulfurization method) for desulfurization is particularly preferable. A hydrodesulfurization method is a desulfurization method including a first step of subjecting the sulfur compounds contained in gas to a hydrogenation process and a second step of adsorbing the sulfur compounds hydrogenated in the first step by means of a desulfurizing agent.

The synthesis gas produced by way of a reforming reaction as described above contains the carbon dioxide generated by a shift reaction that accompanies the steam reforming and the carbon dioxide that is left unreacted after the carbon dioxide reforming. In a synthesis gas production apparatus to be used for this embodiment, such carbon dioxide is separated and collected in the carbon dioxide removal step. While a chemical absorption method, a physical adsorption method and a membrane separation method are known as carbon dioxide separation/collection method, a chemical absorption method of employing an amine-based aqueous solution containing monoethanol amine or the like is preferably used for this embodiment.

Then, as a chemical absorption method of employing an amine-based aqueous solution, a method of using an amine treater including an absorption tower and a regeneration tower may preferably be used. With this method, the carbon dioxide contained in synthesis gas is absorbed by an amine-based aqueous solution containing monoethanol amine or the like in the absorption tower, subsequently the carbon dioxide is released in the regeneration tower by heating the amine-based aqueous solution that has absorbed the carbon dioxide and subjecting the amine-based aqueous solution to a steam-stripping process and then the released carbon dioxide is collected.

When an amine-based aqueous solution is employed, carbon dioxide is absorbed as hydrogencarbonate ions according to reaction formula (3) shown below.

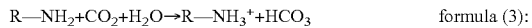
$$R-NH_2+CO_2+H_2O \rightarrow R-NH_3^+ + HCO_3 \quad \text{formula (3):}$$

Since amine-based aqueous solutions such as monoethanol amine are weakly basic, an aqueous solution that has absorbed carbon dioxide as hydrogencarbonate ions releases the absorbed hydrogencarbonate ions as carbon dioxide when the aqueous solution is heated. In this way, the carbon dioxide contained in the produced synthesis gas can be separated and collected.

The carbon dioxide that is separated and collected in this way is subsequently introduced into the reformer again and reutilized for a carbon dioxide reforming reaction.

Since the reforming reaction in the reformer of the synthesis gas production step proceeds at high temperatures, the produced synthesis gas is as hot as about 900° C. at the exit of the reformer. Therefore, the sulfur compounds in the castable that coats the piping that connects the exit of the reformer and the following step can be released in the form of hydrogen sulfide and mixed into the synthesis gas.

The hydrogen sulfide mixed into the synthesis gas is absorbed by the aqueous solution with the carbon dioxide according to reaction formula (4) shown below in the above-described carbon dioxide removal step and released like the carbon dioxide when the aqueous solution is heated.

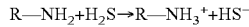
$$R-NH_2+H_2S \rightarrow R-NH_3^+ + HS^-$$

In other words, the separated and collected gas that is separated and collected in a carbon dioxide removal step and subsequently introduced into the reformer contains the hydrogen sulfide released from the castable in addition to the carbon dioxide. When concentration of sulfur compounds in the gas introduced in the reformer exceeds 10 vol-ppb in terms of sulfur atoms, the reforming catalyst may be degraded by sulfur poisoning.

In order to prevent the hydrogen sulfide from being introduced into the reformer, the castable is dried out by flowing purge gas that is steam or steam-containing gas to the piping being employed in a reformed gas production apparatus, to thereby remove the sulfur compounds in the castable prior to the start-up of operation of the synthesis gas production apparatus.

Preferably, the drying out operation is conducted before the start-up of operation of the synthesis gas production apparatus and also before the reforming catalyst is filled into the catalyst tube.

With the above-described arrangement, the sulfur compounds contained in the castable in the inside of the piping can be removed before the start-up of producing synthesis gas, and sulfur compounds can be prevented from being mixed into the generated synthesis gas.

Steam or steam-containing gas is preferably employed as purge gas from the viewpoint of efficiency of removing sulfur compounds. When steam-containing gas is employed, the steam content ratio of the gas is not particularly limited but normally is more than 1 vol-%, preferably more than 10 vol-%, more preferably more than 50 vol-%.

The heating temperature range to be used for drying out operation when purge gas is made to flow is preferably from 650 to 900° C., more preferably from 750 to 900° C. Sulfur compounds can be efficiently removed by flowing purge gas until sulfur compounds is no longer detectable in the exhausted purge gas.

If, for example, the heating temperature range when purge gas is made to flow is from 750 to 900° C., the sulfur compounds in the castable can be removed to less than 1.0 wt-ppm, which is the detectable limit value in terms of sulfur atoms, and to more than 97% of removal efficiency, by flowing purge gas for more than 48 hours.

Preferably, purge gas is not circulated but exhausted.

In this embodiment, it is possible to prevent the reforming catalyst from being degraded when producing synthesis gas by means of the synthesis gas production apparatus using piping provided that the sulfur compounds contained in the castable thereof are removed The synthesis gas that is produced in this way can suitably be used in a Gas-to-Liquids (GTL) process of: subjecting the gas to a Fischer-Tropsch reaction; producing Fischer-Tropsch oil by separating gaseous product from the Fischer-Tropsch reaction product; and subjecting the Fischer-Tropsch oil to a hydrogenation process and distilling the obtained hydrogenation product to separate light hydrocarbon gas and kerosene and gas oil that are the final product, from each other.

Also in a hydrogen production process, hydrogen can suitably be produced from the synthesis gas produced by a synthesis gas production apparatus using piping of the present invention.

The present invention is described as follows in greater detail by way of examples in order to make the present invention further understandable, although the examples by no means limit the scope of the present invention.

EXAMPLES

Example 1

In Example 1, the following experiment was conducted to prove that the sulfur compounds contained in the castable are removed by flowing purge gas through the piping and drying out the piping.

Plycast MIX#786 (tradename) available from PLIBRICO JAPAN (concentration of contained sulfur compounds: 39.5 wt-ppm in terms of sulfur atoms) was used as castable raw material. The castable raw material was kneaded with water and, after it was found that the kneaded raw material gave rise to strength, the kneaded material was crushed to small pieces of 2 mm to 4 mm. Table 1 shows the chemical composition of the castable before the test. SUS reaction tube 14 in which pieces 11 of the castable were filled between alumina beads layers 12 and 13 was heated to a predetermined temperature and steam or steam/nitrogen mixture gas was made to flow from the top of the apparatus for 48 hours (FIG. 1).

TABLE 1

Chemical Composition of Castable

| | |
|---|---|
| $Al_2O_3$ | 90.0% |
| $SiO_2$ | 1.0% |
| concentration of sulfur compounds in terms of sulfur atoms | 39.5 wt-ppm |

After passing through the castable, the moisture content of the purge gas was condensed into water in a cooler 15 to separate the gas from the liquid and the quantity of the sulfur compounds flown out from the castable after flowing purge gas was measured by measuring the concentration of the sulfur compounds in the condensed water 16 by way of ICP (inductively coupled plasma) analysis and measuring the concentration of the sulfur compounds in the nitrogen gas 17 by way of gas chromatography, using sulfur chemiluminescence detector SCD (SCD-GC).

After the end of the experiment, the castable was drawn out and the concentration of the sulfur compounds remaining in the castable was also measured.

Table 2 shows the results obtained after flowing purge gas for 48 hours. Regardless whether steam or steam/nitrogen mixture gas was made to flow, both the concentration of the sulfur compounds discharged into the gas and that of the sulfur compounds discharged into the liquid were reduced to nil after 48 hours. Additionally, the concentration of the sulfur compounds remaining in the castable decreased to 1.0 wt-ppm (below the detectable limit) in terms of sulfur atoms after 48 hours.

TABLE 2

Experimental conditions and results in test for removing sulfur compounds

| | purge gas | |
|---|---|---|
| | steam | mixture gas of steam and $N_2$ |
| heating time (h) | 48 | 48 |
| temperature of filled layer (° C.) | 750 | 750 |
| pressure (MPaG) | 0 | 0 |
| filled amount (cc) | 7.5 | 7.5 |
| $H_2O$ flow rate (NL/h) | 100 | 100 |
| $N_2$ flow rate (NL/h) | 0 | 50 |
| concentration of sulfur compounds in exit gas in terms of sulfur atoms after 48 hours (vol-ppb) | — | 0 |
| Concentration of sulfur compounds in condensed water in terms of sulfur atoms after 48 hours (wt-ppb) | 0 | 0 |
| Concentration of remaining sulfur compounds in sample in terms of sulfur atoms after 48 hours (wt-ppm) | <1.0 | <1.0 |
| efficiency of sulfur compounds removed from castable after 48 hours (%) | >97.5 | >97.5 |

Example 2

The experiment of Example 2 was conducted to confirm that no sulfur compounds is mixed into synthesis gas from the castable after purge gas was made to flow for 48 hours.

A layer of the castable 21 that was treated with steam at the test of Example 1 was arranged downstream relative to a reforming catalyst 28 in a SUS reaction tube to conduct a reforming reaction test for producing synthesis gas with an $H_2/CO$ ratio of 2.0 (FIG. 2) and checked if the synthesis gas 29 discharged from the reactor exit contained any sulfur compounds or not by means of SCD-GC analysis.

Table 3 shows the results. As shown in Table 3, no sulfur compounds were discharged into the produced synthesis gas during the reforming reaction continued for 500 hours. Thus, it was confirmed that the contained sulfur compounds could be removed from the castable by a steam treatment.

TABLE 3

Reforming Reaction Test Conditions and Results

| | reaction time [h] | |
|---|---|---|
| | 0 | 500 |
| entrance temperature of catalyst layer [° C.] | 500 | 500 |
| exit temperature of catalyst layer [° C.] | 850 | 850 |
| average temperature of castable layer [° C.] | 500 | 500 |
| pressure [MPaG] | 2.1 | 2.1 |
| catalyst amount [cc] | 81 | 81 |
| GHSV [$h^{-1}$] | 3,000 | 3,000 |
| town gas flow rate [NL/h] | 88.2 | 88.2 |
| $H_2O$ flow rate [NL/h] | 109.5 | 109.5 |
| $CO_2$ flow rate [NL/h] | 42.4 | 42.4 |
| $H_2$ flow rate [NL/h] | 3.0 | 3.0 |
| total flow rate [NL/h] | 243.1 | 243.1 |
| $H_2O/C$ ratio [—] | 1.07 | 1.07 |
| $CO_2/C$ ratio [—] | 0.41 | 0.41 |
| concentration of sulfur compounds in produced gas in terms of sulfur atoms [vol-ppb] | 0 | 0 |
| concentration of residual sulfur compounds in castable in terms of sulfur atoms [wt-ppm] | <1.0 | <1.0 |

Example 3

The test apparatus same as that of Example 1 was used to conduct a sulfur compounds removal test under the steam/nitrogen mixture gas conditions same as those of Example 1 except the temperature of the castable layer, in order to look into the change with heating temperature in the sulfur compounds removal efficiency when flowing purge gas. As a result, it was found that the sulfur compounds removal efficiencies of the castable were respectively 80% and 97% when temperature of castable layer was held to 650° C. and 750° C. and steam/nitrogen mixture gas was flown for 48 hours.

Comparative Examples 1-5

The tests of these comparative examples were conducted in a manner as described below in order to check the sulfur compounds removal efficiencies when purge gases not containing steam were employed.

A test apparatus similar to that of Example 1 was employed to conduct sulfur compounds removal tests under the conditions same as those of Example 1 except that different purge gas compositions as shown in Table 4 were used for the comparative examples to determine the residual sulfur compounds concentrations in the castable 31 and the sulfur compounds removal efficiencies (FIG. 3).

Table 4 shows the results. As shown in Table 4, the sulfur compounds removal efficiencies were 14 to 52% when the gases not containing steam were fed.

TABLE 4

Experimental conditions and results in test for removing sulfur compounds

|  | Comp. Ex. 1 | Comp. Ex. 2 | Comp. Ex. 3 | Comp. Ex. 4 | Comp. Ex. 5 |
|---|---|---|---|---|---|
| heating time [h] | 48 | 48 | 48 | 48 | 48 |
| castable layer temperature [° C.] | 650 | 750 | 850 | 750 | 750 |
| pressure [MPag] | 0.0 | 0.0 | 0.0 | 0.0 | 0.0 |
| filled amount [cc] | 15 | 15 | 15 | 15 | 15 |
| $H_2$ flow rate [NL/h] | 0 | 0 | 0 | 0 | 20 |
| $N_2$ flow rate [NL/h] | 200 | 200 | 200 | 0 | 180 |
| air flow rate [NL/h] | 0 | 0 | 0 | 200 | 0 |
| total flow rate [NL/h] | 200 | 200 | 200 | 200 | 200 |
| concentration of residual sulfur compounds in castable in terms of sulfur atoms [wt-ppm] | 34.1 | 30.3 | 24.8 | 19.0 | 27.3 |
| Removal efficiency of sulfur compounds [%] | 13.7 | 23.3 | 37.2 | 51.9 | 30.9 |

Comparative Example 6

Figure 4:
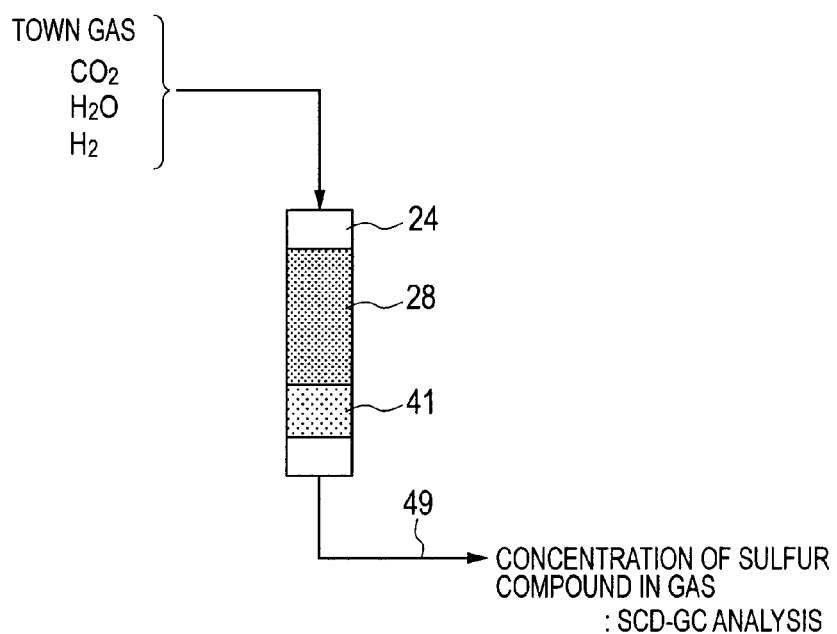
FIG. 4 is a schematic illustration of the reforming reaction test in Comparative Example 6.

A layer of castable 41 (15 cc), from which sulfur compounds were removed by the experiment of Comparative Example 4, was arranged downstream relative to a catalyst layer as in Example 2 to conduct a reforming reaction test and see if sulfur compounds discharged into the produced synthesis gas 49 were detected or not, by means of SCD-GC analysis (FIG. 4). Filled amount of castable was 15 cc. Table 5 shows the results. As shown in Table 5, it was confirmed that sulfur compounds were continuously discharged into the produced gas immediately after the start of the reaction. Thus, it was confirmed that sulfur compounds cannot be removed satisfactorily by a heating pretreatment that does not employ steam.

TABLE 5

Reforming Reaction Test Conditions and Results

|  | reaction time [h] | |
|---|---|---|
|  | 0 | 500 |
| entrance temperature of catalyst layer [° C.] | 500 | 500 |
| exit temperature of catalyst layer [° C.] | 850 | 850 |
| average temperature of castable layer [° C.] | 500 | 500 |
| pressure [MPaG] | 2.1 | 2.1 |
| catalyst amount [cc] | 81 | 81 |
| GHSV [$h^{-1}$] | 3,000 | 3,000 |
| town gas flow rate [NL/h] | 88.2 | 88.2 |
| $H_2O$ flow rate [NL/h] | 109.5 | 109.5 |
| $CO_2$ flow rate [NL/h] | 42.4 | 42.4 |
| $H_2$ flow rate [NL/h] | 3.0 | 3.0 |
| Total flow rate [NL/h] | 243.1 | 243.1 |
| $H_2O$/C ratio [—] | 1.07 | 1.07 |
| $CO_2$/C ratio [—] | 0.41 | 0.41 |
| Concentration of sulfur compounds in produced gas in terms of sulfur atoms [vol-ppb] | 90 | 100 |
| concentration of residual sulfur compounds in castable in terms of sulfur atoms [wt-ppm] | 19.0 | 17.0 |

This application claims the benefit of Japanese Patent Application No. 2010-045698, filed Mar. 2, 2010, which is hereby incorporated by reference herein in its entirety.

| 11 | pieces of castable |
| 12 | alumina beads layers |
| 13 | alumina beads layers |
| 14 | SUS reaction tube |
| 15 | cooler |
| 16 | condensed water |
| 17 | nitrogen gas |
| 21 | castable |
| 24 | SUS reaction tube |
| 28 | reforming catalyst |
| 29 | synthesis gas |
| 31 | castable |
| 41 | castable |
| 49 | synthesis gas |

The invention claimed is:

1. A method for removing sulfur compounds from a castable, comprising:

drying out the castable by flowing purge gas, thereby removing the sulfur compounds from the castable, wherein the purge gas is steam or steam-containing gas, and wherein the castable is coated as a refractory material on the inner surface of a reactor and piping, wherein the sulfur compounds were present in the castable as originally coated onto the inner surface of the reactor and piping.

2. The method according to claim 1, wherein the purge gas is steam.

3. The method according to claim 1, wherein the purge gas is steam-containing gas.

4. The method according claim 1, wherein the drying out step is performed at a temperature of 750 to 900° C.

5. The method according to claim 4, wherein the drying out operation is conducted for more than 48 hours.

6. The method according to claim 1, wherein the piping is used in a synthesis gas production apparatus and the drying out step is conducted prior to the start-up of operation of the synthesis gas production apparatus.

7. The method according to claim 6, wherein the temperature range of the drying out operation is from 750 to 900° C.

8. The method according to claim 7, wherein the drying out operation is conducted for more than 48 hours.

9. The method according to claim 6, wherein the drying out step is conducted prior to filling reformer tube of the synthesis gas production apparatus with a reforming catalyst.

10. The method according to claim 9, wherein the temperature range of the drying out operation is from 750 to 900° C.

11. The method according to claim 10, wherein the drying out operation is conducted for more than 48 hours.

\* \* \* \* \*